United States Patent
He et al.

(10) Patent No.: US 8,625,051 B2
(45) Date of Patent: Jan. 7, 2014

(54) LIQUID CRYSTAL DISPLAY AND BACKLIGHT MODULE FOR THE SAME

(75) Inventors: Chengming He, Shenzhen (CN); Yicheng Kuo, Shenzhen (CN); Jie Ren, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 265 days.

(21) Appl. No.: 12/994,175

(22) PCT Filed: Sep. 21, 2010

(86) PCT No.: PCT/CN2010/077217
§ 371 (c)(1),
(2), (4) Date: Nov. 23, 2010

(87) PCT Pub. No.: WO2012/006813
PCT Pub. Date: Jan. 19, 2012

(65) Prior Publication Data
US 2012/0069268 A1   Mar. 22, 2012

(30) Foreign Application Priority Data
Jul. 14, 2010   (CN) .......................... 2010 1 0230815

(51) Int. Cl.
G02F 1/1335   (2006.01)
(52) U.S. Cl.
USPC ............................... 349/64; 349/62; 362/97.3
(58) Field of Classification Search
USPC ...................................... 349/62, 64; 362/97.3
See application file for complete search history.

(56) References Cited

U.S. PATENT DOCUMENTS

| | | | |
|---|---|---|---|
| 2005/0243243 A1 | 11/2005 | Koganezawa | |
| 2006/0221629 A1* | 10/2006 | Seong et al. | 362/561 |
| 2007/0147023 A1* | 6/2007 | Matsushita | 362/97 |
| 2009/0059129 A1* | 3/2009 | Wang et al. | 349/65 |
| 2010/0002169 A1* | 1/2010 | Kuramitsu et al. | 349/65 |

FOREIGN PATENT DOCUMENTS

| | | |
|---|---|---|
| CN | 2599716 Y | 1/2004 |
| CN | 1534339 A | 10/2004 |
| CN | 1716042 A | 1/2006 |
| CN | 101178511 A | 5/2008 |
| CN | 201502963 U | 6/2010 |

* cited by examiner

*Primary Examiner* — Michael Caley
(74) *Attorney, Agent, or Firm* — Ditthavong Mori & Steiner, P.C.

(57) ABSTRACT

The present invention discloses a backlight module and a liquid crystal display (LCD) using the same, which can achieve local dimming. The backlight module includes a light guide plate (LGP), which has a groove formed on a bottom. A cross-section of the groove can be arc-shaped. The backlight module further has a plurality of light sources disposed under the LGP at positions corresponding to the groove. The light sources can be two LED light bars. Light emitted from the light bars enters into the LGP and radiates from the LGP. The present invention does not require so many light sources, and thereby power consumption is reduced. The light sources are disposed under the LGP, so that heat can be dissipated through a back plate of the LCD.

11 Claims, 6 Drawing Sheets

Prior Art
FIG. 1

Prior Art

LIQUID CRYSTAL DISPLAY AND BACKLIGHT MODULE FOR THE SAME

TECHNICAL FIELD OF THE INVENTION

The present invention relates to a liquid crystal displaying technique, more particularly, to an improved backlight module for a liquid crystal display, the backlight module is capable of accomplishing local dimming.

BACKGROUND OF THE INVENTION

Nowadays, liquid crystal displays (LCDs) are becoming the main stream of displaying technology, and are being widely applied to various electronic products, such as a mobile phone, a PDA, a digital camera, a computer screen, a notebook screen and the like. A backlight module is one of the crucial components being a deciding factor of the quality of an LCD. Generally, the illuminating light source of the backlight module is implemented by an electro-luminance (EL) element, a light emitting diode, or a cold cathode fluorescent lamp. Among the above three light sources, LEDs are widely utilized in small LCD devices due to the small volume, light weight and excellent controllability.

LED backlight modules can be classified into types of direct-lit backlight modules and edge-lit backlight modules according to the disposal of the light sources thereof. In a direct-lit backlight module, LED dice are evenly disposed under a liquid crystal panel and server as the light sources, and thereby uniformly transmitting the backlight all over the screen.

Figure 1:
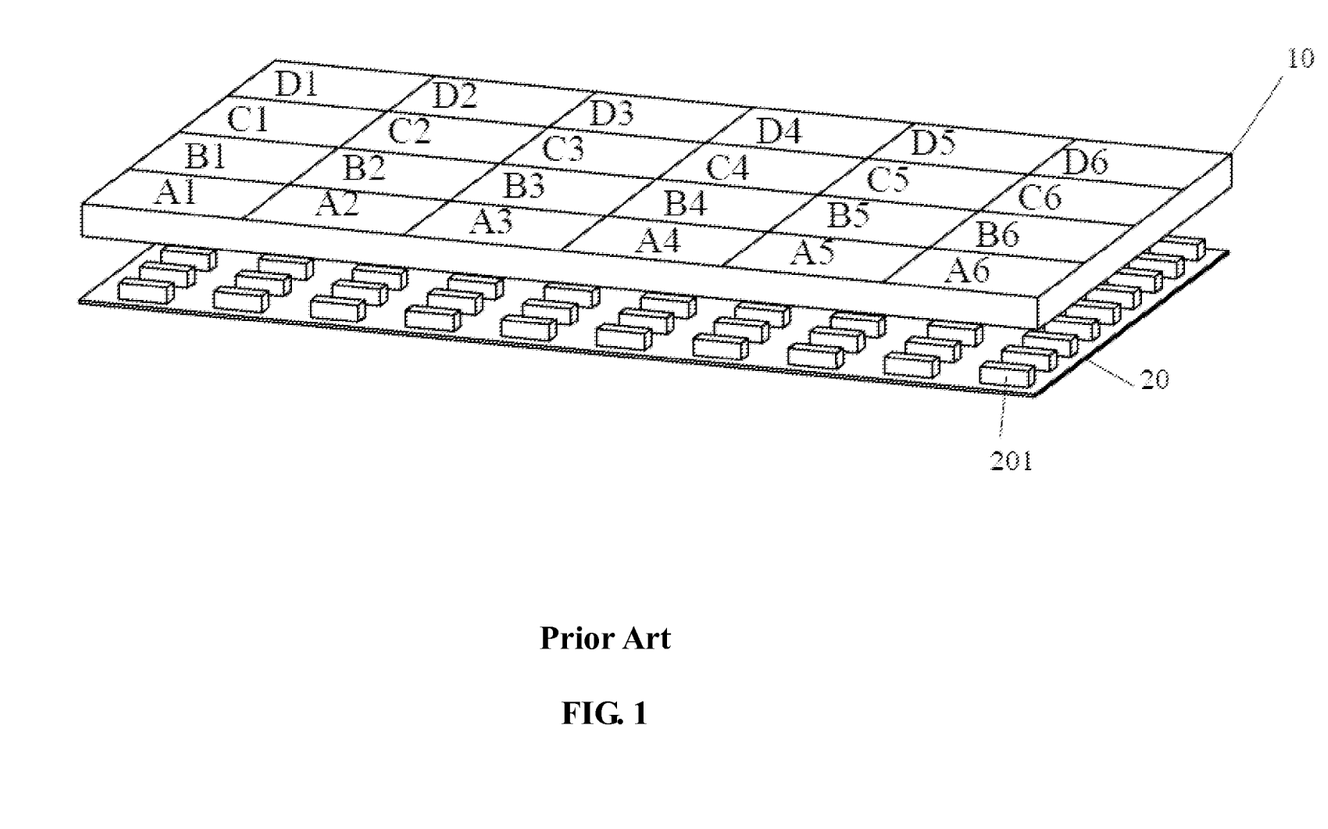
FIG. 1 is a schematic diagram showing an application example of a conventional direct-lit LED backlight module.

FIG. 1 is a schematic diagram showing an application example of a conventional direct-lit LED backlight module. For purpose of simplicity and clarity, some components are omitted in the drawings. As shown, in an LCD, a light source constituted by an LED matrix 20 is disposed under a liquid crystal glass 10. The LED matrix 20 comprises a number of LED dice 201 arranged in columns and rows. The liquid crystal glass 10 comprises liquid crystal being sandwiched therein. The liquid crystal glass has been used in various applications. Since it is not the focus of the present invention, the details thereof are omitted herein.

In such a structure, the LED dice 201 are arranged under the liquid crystal glass 10 to provide the liquid crystal glass 10 with light illumination. Accordingly, local dimming can be easily accomplished. In this example, the liquid crystal glass 10 is divided into regions A1 to A6, B1 to B6, C1 to C6 and D1 to D6. By controlling the LED dice corresponding to the respective regions, the local dimming of each region can be achieved. The LED matrix 20 can transfer the heat thereof directly to a back plate (not shown) to accomplish heat dissipation. However, a great quantity of the LED dice are necessary for such a structure, and more electrical power is consumed thereof. Furthermore, the finished LCD will have a greater thickness since there is a layer of the LED matrix 20.

Figure 2:
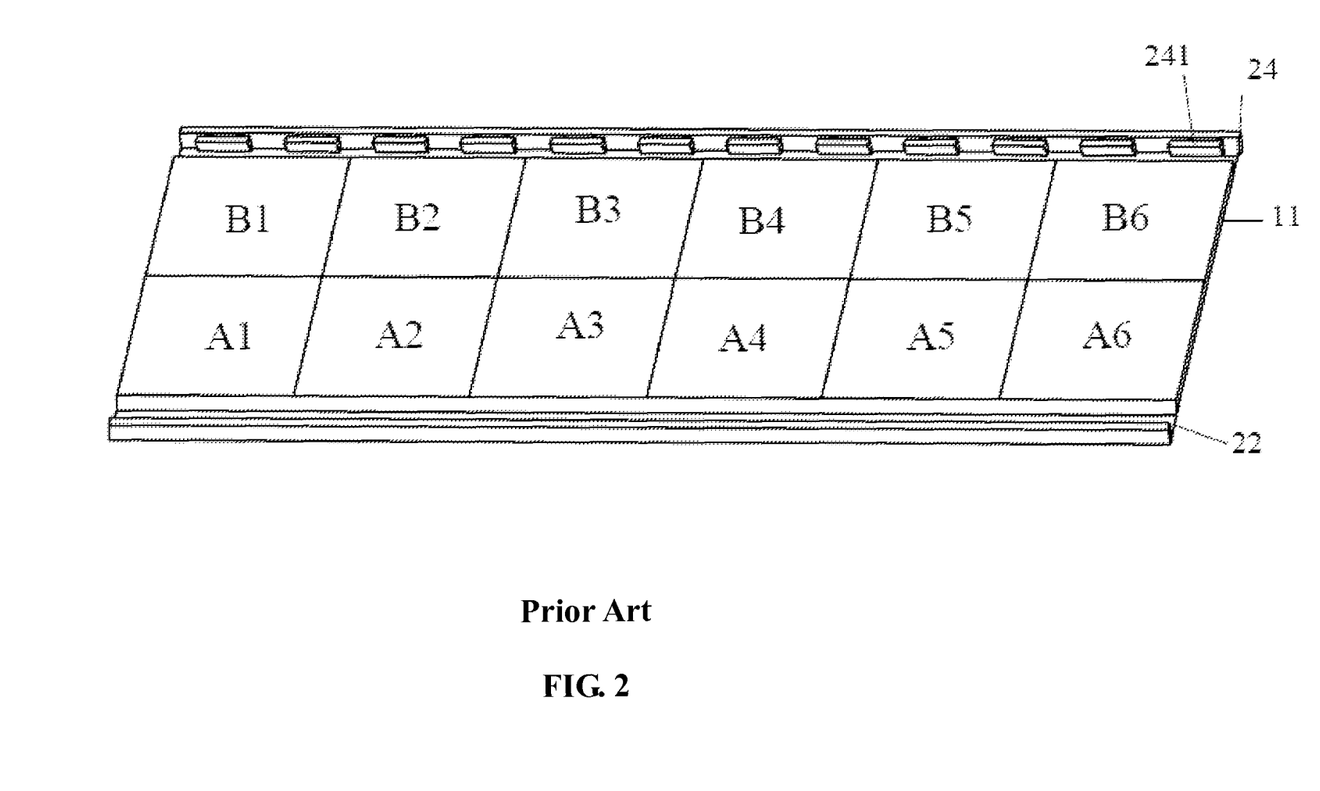
FIG. 2 is a schematic diagram showing an application example of a conventional edge-lit LED backlight module.

FIG. 2 is a schematic diagram showing an application example of a conventional edge-lit LED backlight module. As shown, LED light bars 22, 24, are disposed at the two long sides of a liquid crystal glass 11 respectively. Taking the LED light bar 24 as an example, the LED light bar 24 comprises a plurality of LED dice 241. In this example, the LED light bar 22 is used to control the luminance of each of the regions A1 to A6 of the liquid crystal glass 11; the LED light bar 24 is used to control the luminance of each of the regions B1 to B6 of the liquid crystal glass 11. The edge-lit LED backlight module requires fewer LED dice. However, in such a structure, the heat generated by the LED light bars 22, 24, needs to be transferred to the back plate through a metal substrate (e.g. an aluminum substrate) to dissipate the heat. The accomplishment of heat dissipation is inconvenient and the effect thereof is unfavorable. Further, the local dimming of the respective regions is likely to be interfered by each other.

Therefore, an improved backlight module is required to solve the existing problems of the current technique.

SUMMARY OF THE INVENTION

A main objective of the present invention is to provide a backlight module which can achieve the purpose of illumination with limited power consumption and have favorable heat dissipation.

Another objective of the present invention is to provide a liquid crystal display (LCD) comprising a backlight module which can achieve the purpose of illumination with limited power consumption and have favorable heat dissipation.

To achieve one of the foregoing objectives, the present invention provides a backlight module. The backlight module comprises a light guide plate having a groove formed on a bottom thereof, and a number of light sources disposed under the light guide plate at positions corresponding to the groove, such that light emitted from the light sources enters into the light guide plate and radiates from the light guide plate.

To achieve another one of the objectives, the present invention provides a liquid crystal display which comprises a liquid crystal panel, a back plate and a backlight module for illuminating the liquid crystal panel. The backlight module is disposed on the back plate, and is characterized in that: the backlight module comprises a light guide plate having a groove formed on a bottom thereof; a number of light sources disposed under the light guide plate at positions corresponding to the groove, and light emitted from the light sources enters into the light guide plate as well as radiates from the light guide plate.

In accordance with the present invention, the groove of the light guide plate is preferred to be formed in the middle of the bottom to longitudinally cut across the light guide plate and divide the light guide plate into two halves. The cross-section of the groove is preferably arc-shaped, and the arc curvature is set in coordination with the disposal of the light sources.

In accordance with the present invention, the light sources comprise two LED light bars, and each is in charge of lighting and shading of one half of the light guide plate. The two LED light bars can be disposed abreast side by side or slantwise disposed back to back at an angle of inclination.

In accordance with the present invention, preferably, a first spacer can be used to insulate the two LED bars from each other.

Further, in correspondence to the first spacer, a second spacer can be disposed in the light guide plate to separate the two halves of the light guide plate. In addition, screen dots can be formed on a light emitting side of the light guide plate corresponding to the groove to avoid generation of a bright band resulted from the groove.

To make the present invention more manifest and understandable, preferred embodiments will be described in detail in conjunction with the appending drawings:

DETAILED DESCRIPTION OF THE INVENTION

To make the forgoing objectives, features, and advantages more manifest and understandable, preferred embodiments of the present invention will be described in detail in conjunction with the appending drawings. Further, the directional terms described in the present invention such as "above", "under", "front", "rear", "left", "right", "internal", "external", "side", "bottom", "top" or the like only indicate the directions with reference to the drawings. Thus, those directional terms are only used for describing and understanding the present invention rather than limiting the scope of the present invention.

Generally speaking, a liquid crystal display (LCD) comprises at least a liquid crystal panel (e.g. a liquid crystal glass) and a backlight module. The backlight module is utilized for illuminating the liquid crystal panel. The backlight module usually comprises a light source or light sources, a light guide plate and other optical films such as a reflector film, a diffuser film, a polarizer film and the like. The light guide plate is generally made of transparent material such as optical PMMA (Polymethyl Methacrylate). The light guide plate is used to evenly scatter the light from the light source(s) all over the displaying panel of the LCD. The above structure can be disposed on a back plate of the LCD. In the present invention, the light guide plate is designed to have a specific geometrical structure and the light sources are adaptively disposed so as to achieve the effect of local dimming and the effect being apt to dissipate heat at the same time.

Figure 3:
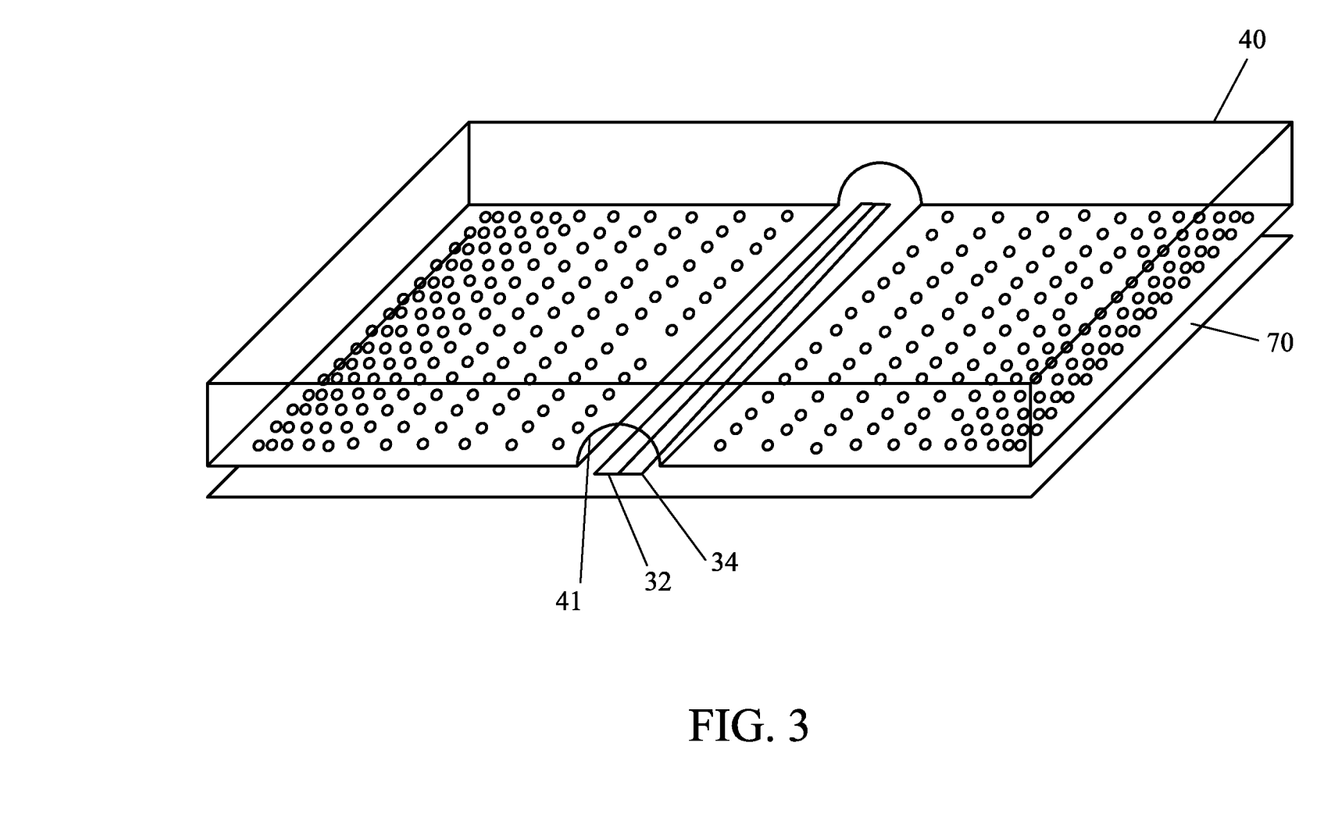
FIG. 3 is a schematic diagram showing a perspective view of a backlight module in accordance with a first embodiment of the present invention.

Please refer to FIG. 3, which is a schematic diagram showing a perspective view of a backlight module in accordance with a first embodiment of the present invention. In the present embodiment, a groove 41 is formed in the middle of a bottom of a light guide plate (LGP) 40. In this embodiment, the groove 41 longitudinally cuts across the LGP 40 to divide the LGP into a left half and a right half. A plurality of (two in the embodiment) bar-like light sources 32, 34, are disposed under the LGP at positions corresponding to the groove 41. As shown, the light sources are disposed corresponding to the groove 41 and under the LGP. For example, they are disposed on a back plate (not shown) of the liquid crystal display directly. The bar-like light sources 32, 34, can be light bars, for example, LED light bars. In the present embodiment, the cross-section of the groove 41 is arc-shaped as shown.

In accordance with the present invention, the light source 32 is in charge of the illumination for the left half of the LGP 40, while the light source 34 is in charge of the illumination for the right half of the LGP 40. The light radiated from the light sources 32 and 34 enters into the LGP 40 and is evenly emitted from the LGP 40. In the present embodiment, the light source 32 and the light source 34 are disposed abreast to each other side by side, as shown. Since the light sources 32, 34 are disposed on a back plate 70 of the liquid crystal display under the light guide plate 40, the generated heat can be transferred to the back plate 70 to be dissipated, thereby achieving favorable effect of heat dissipation.

According to the present invention, although the light sources are disposed under the LGP 40, not so many LED chips are required as in the conventional direct-lit backlight module since there is the groove 41 of the LGP 40 in the design, thereby the power consumption is reduced.

To prevent a bright band from being generated above the region of the arc-shaped groove 41 in the LGP 40, several manners can be adopted to solve this problem. For example, screen dots of different densities can be formed on a light emitting side of the light guide plate 40 corresponding to the region of the arc-shaped groove 41, as shown in the drawing. The screen dots are distributed symmetrically with respect of the groove 41. The screen dots are designed for eliminating the bright band phenomenon due to the existence of the arc-shaped groove 41.

Figure 4:
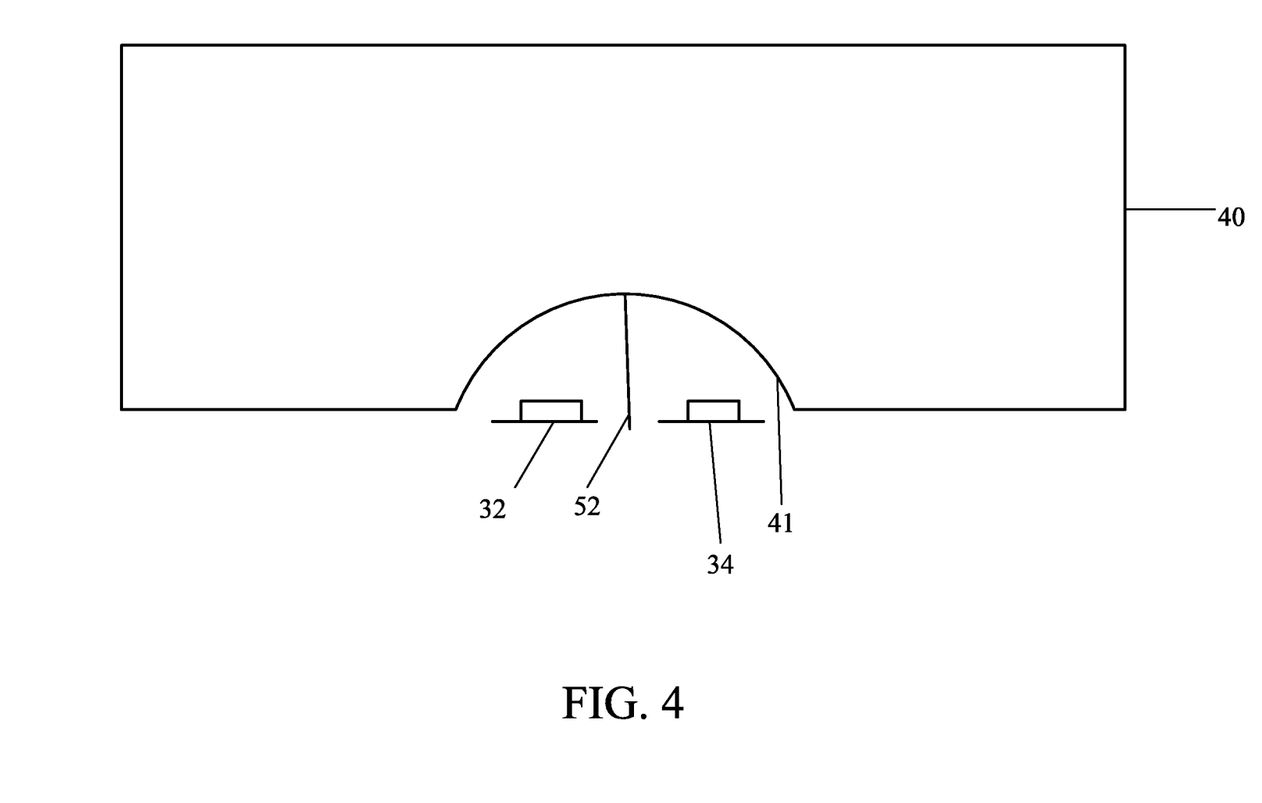
FIG. 4 is a schematic diagram showing a perspective view of a backlight module in accordance with a second embodiment of the present invention.

Please refer to FIG. 4 which is a schematic diagram showing a perspective view of a backlight module in accordance with a second embodiment of the present invention. The structure of the backlight module of the present embodiment is basically and substantially similar to the structure of the first embodiment. As described above, the light source 32 is in charge of the illumination of the left half of the LGP 40, and the light source 34 is in charge of the illumination of the right half of the LGP 40. According to the present embodiment, the difference from the first embodiment is that in order to prevent the light emitted by the light source 32 from influencing the right half of the LGP 40 and prevent the light emitted by the light source 34 from influencing the left half of the LGP 40 as best as possible, a first spacer 52 is disposed between the light source 32 and the light source 34 for separating the light source 32 and the light source 34, thereby eliminating mutual interferences. The first spacer 52 can be implemented by a double-sided reflective film.

Figure 5:
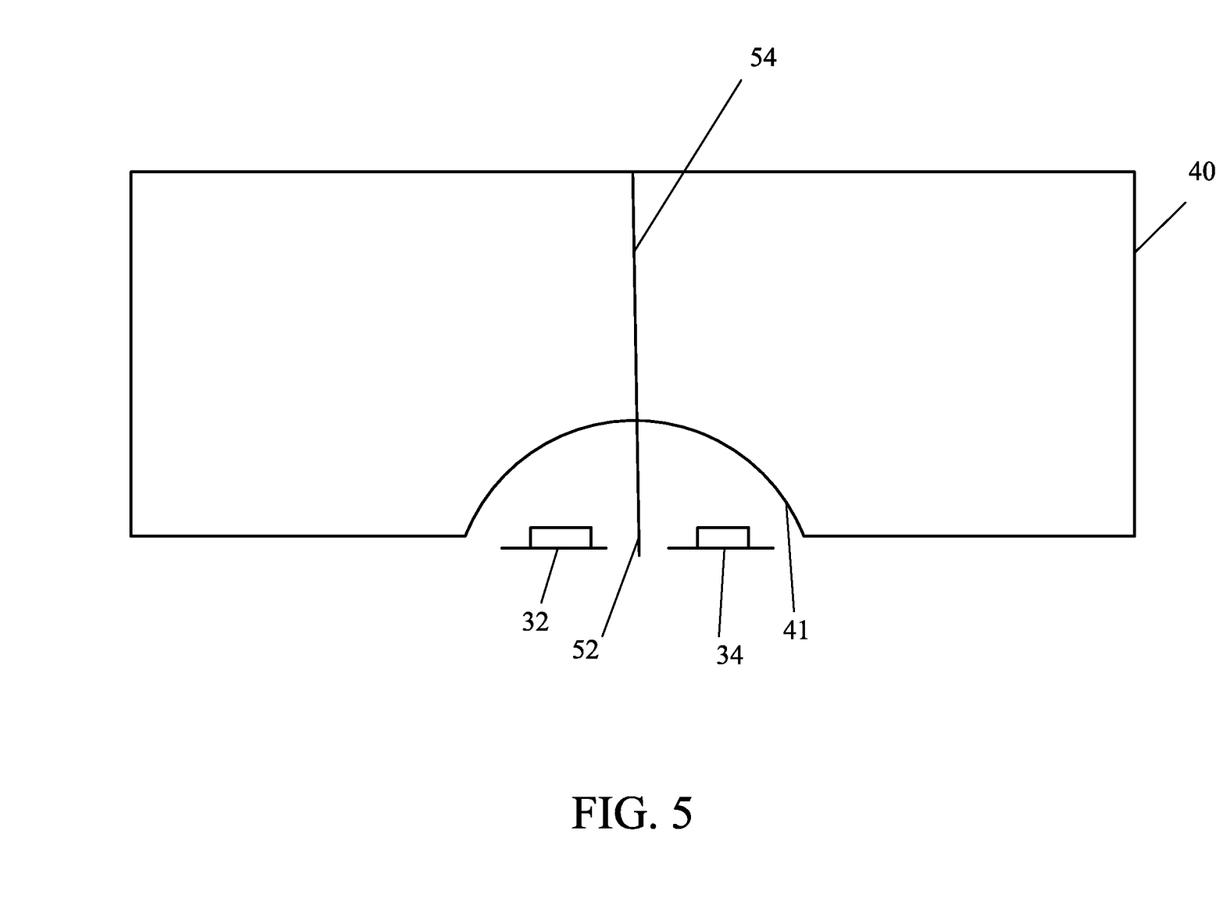
FIG. 5 is a schematic diagram showing a perspective view of a backlight module in accordance with a third embodiment of the present invention.

Please refer to FIG. 5, which is a schematic diagram showing a perspective view of a backlight module in accordance with a third embodiment of the present invention. The structure of the backlight module of the present embodiment is basically and substantially similar to the structure of the second embodiment. According to the present embodiment, the difference is that the left half and the right half of the LGP 40 is separated by a second spacer 54 in addition to the first spacer 52 being used for separating the light source 32 and the light source 34. That is, the second spacer 54 is disposed at a position in the LGP 40 corresponding to the groove 41 to insulate the LGP 40 into different regions. As shown, the second spacer 54 is preferably aligned with the first spacer 52. The second spacer 54 can also be implemented by a double-sided reflective film, and can be made of the same material as the first spacer 52, and can even be produced integrally with the first spacer. That is, the first spacer 52 and the second spacer 54 can be the same double-sided reflective film. As such, preferable independent local dimming control of the left and right halves can be achieved.

To improve the optical performance of the backlight module and to further solve the bright band problem, emission angles of the light sources 32, 34, and the arc curvature of the arc-shaped groove 41 can be designed in mutual coordination so as to reduce the phenomenon of the bright band. That is, the arc curvature of the arc-shaped groove 41 is determined according to the disposal of the light sources 32, 34, or conversely, the disposal manner of the light sources 32, 34 is determined according to the arc curvature of the arc-shaped groove 41.

Figure 6:
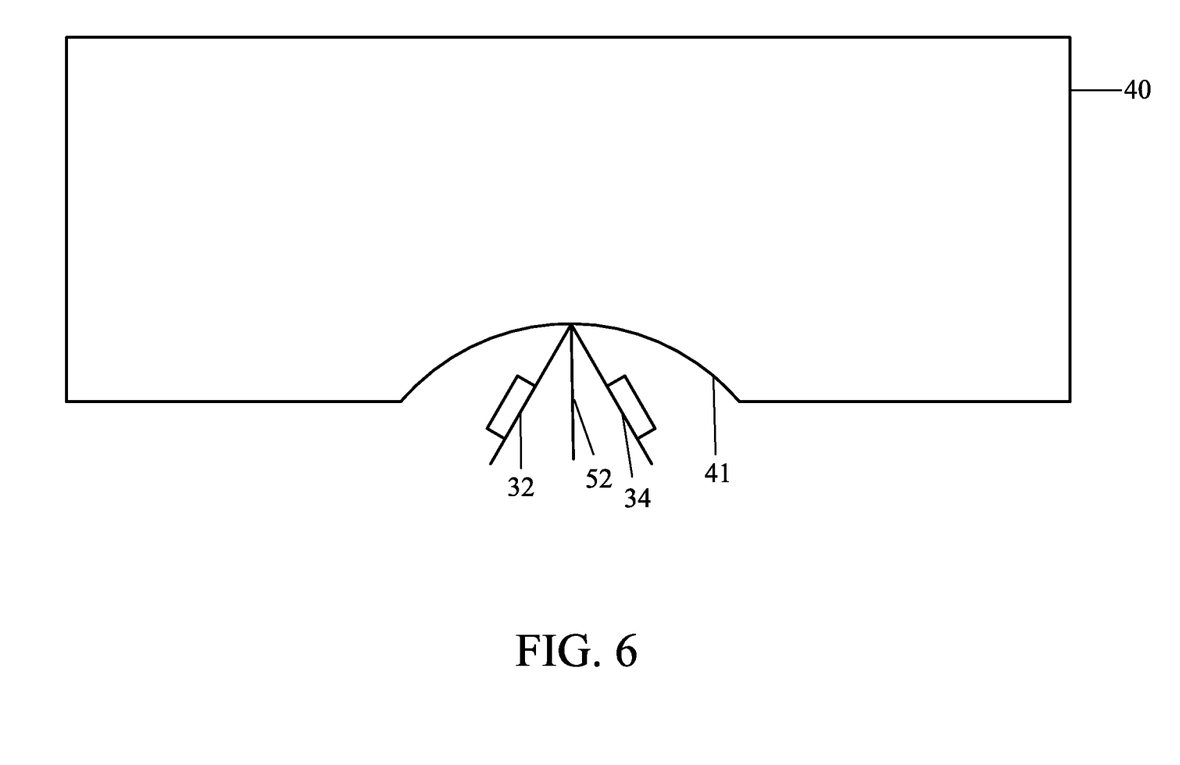
FIG. 6 is a schematic diagram showing a perspective view of a backlight module in accordance with a fourth embodiment of the present invention.

Please refer to FIG. 6, which is a schematic diagram showing a perspective view of a backlight module in accordance with a fourth embodiment of the present invention. The structure of the backlight module of the present embodiment is basically and substantially similar to the structure of the second embodiment. According to the present embodiment, the difference is that the light source 32 and the light source 34 (i.e. the light bar 32 and the light bar 34) are disposed back to back at an angle of inclination so as to eliminate the bright band phenomenon. To coordinate with the inclination angle of the light source 32 and the light source 34, the arc curvature of the arc-shaped groove 41 can be somewhat changed. For instance, in the example shown in this drawing, the arc curvature of the arc-shaped groove 41 is less as compared to that in the previous embodiments.

As the foregoing embodiments, the first spacer 52 can be disposed between the light source 32 and the light source 34. Similarly, the second spacer (not shown in this drawing) can be disposed in the LGP 40 to align with the first spacer 52 for insulating the LGP 40 into two halves.

Local dimming can be realized with limited power consumption by the backlight module designed according to the present invention and the liquid crystal display using such a backlight module. The mutual influence among the respective regions is little. In addition, the heat generated by the light sources can be transferred directly to the back plate of the liquid crystal display, and therefore the effect of heat dissipation is favorable.

From the foregoing, while the present invention has been disclosed by describing the preferred embodiments, various modifications and alterations can be made by persons skilled in this art without departing from the spirit and realm of the present invention, and therefore the claimed scopes of the present invention to be protected should be according to the scopes defined in the appended claims.

What is claimed is:

1. A liquid crystal display comprising a liquid crystal panel, a back plate and a backlight module for illuminating the liquid crystal panel, said backlight module being disposed on the back plate, characterized in that: said backlight module comprising:
    a light guide plate having a groove formed on a bottom thereof, said groove having an arc-shaped cross-section, wherein the arc-shaped cross-section is substantially semicircular or semi-elliptical;
    at least two light sources disposed on the back plate at a position under the light guide plate and corresponding to said groove, light emitted from said light sources entering into said light guide plate and radiating from said light guide plate;
    a first spacer disposed between said light sources; and
    a second spacer disposed in said light guide plate corresponding to said groove to separate said light guide plate into different regions, and aligned with the first spacer, wherein said first spacer and said second spacer are implemented by double-sided reflective films.

2. The liquid crystal display according to claim 1, characterized in that:
    said light guide plate has screen dots formed on a light emitting side corresponding to said groove.

3. The liquid crystal display according to claim 1, characterized in that:
    each of said light sources comprises a light emitting diode light bar.

4. The liquid crystal display according to claim 1, characterized in that:
    said light sources are disposed abreast side by side.

5. The liquid crystal display according to claim 1, characterized in that:
    said light sources are disposed back to back at an angle of inclination.

6. A backlight module for a liquid crystal display, characterized in that:
    said backlight module comprising:
    a light guide plate having a groove formed on a bottom;
    at least two light sources disposed at a position under said light guide plate corresponding to said groove, light emitted from said light sources entering said light guide plate and radiating from said light guide plate, wherein said groove has an arc-shaped cross-section, and the arc-shaped cross-section is semicircular or semi-elliptical;
    a first spacer disposed between said light sources; and
    a second spacer disposed in said light guide plate corresponding to said groove to separate said light guide plate into different regions, and aligned with the first spacer, wherein said first spacer and said second spacer are implemented by double-sided reflective films.

7. The backlight module according to claim 6, characterized in that: said light guide plate has screen dots formed on a light emitting side corresponding to said groove.

8. The backlight module according to claim 6, characterized in that:
    said first spacer is implemented by a double-sided reflective film.

9. The backlight module according to claim 6, characterized in that:
    said second spacer is implemented by a double-sided reflective film.

10. The backlight module according to claim 6, characterized in that:
    said light sources are disposed abreast side by side.

11. The backlight module according to claim 6, characterized in that:
    said light sources are disposed back to back at an angle of inclination.

* * * * *

UNITED STATES PATENT AND TRADEMARK OFFICE
CERTIFICATE OF CORRECTION

| | | |
|---|---|---|
| PATENT NO. | : 8,625,051 B2 | Page 1 of 1 |
| APPLICATION NO. | : 12/994175 | |
| DATED | : January 7, 2014 | |
| INVENTOR(S) | : Chengming He et al. | |

It is certified that error appears in the above-identified patent and that said Letters Patent is hereby corrected as shown below:

On the Title Page, and in the Specification, Col. 1, Line 1 please correct the title:

"LIQUID CRYSTAL DISPLAY AND BACKLIGHT MODULE FOR THE SAME"

should read

--LIQUID CRYSTAL DISPLAY AND BACKLIGHT MODULE HAVING LIGHT SOURCE DISPOSED CORRESPONDING TO GROOVE IN LIGHT GUIDE PLATE--

Signed and Sealed this
Twentieth Day of May, 2014

Michelle K. Lee
*Deputy Director of the United States Patent and Trademark Office*